United States Patent Office 2,887,438
Patented May 19, 1959

2,887,438

PROLONGED ACTION TABLETS

Jack Cooper, Summit, and John Joseph Windheuser, Milton, N.J., assignors to Ciba Pharmaceutical Products, Inc., Summit, N. J., a corporation of New Jersey No Drawing. Application March 27, 1956
Serial No. 574,102

11 Claims. (Cl. 167—82)

This invention relates to new and useful improvements in pharmaceutical preparations. More particularly, this invention is concerned with orally administrable dosage unit forms having a prolonged therapeutic action and to methods for preparing such forms.

Recent developments in the treatment of chronic afflictions such as asthma, hay fever, arthritis, ulcers, hypertension and similar disturbances, have created a demand for dosage forms wherein the therapeutically active components are absorbed into the blood stream slowly and evenly over a prolonged period of time. Although convenience to the patient and reduction in cost are motivating factors for prescribing long-acting dosage forms, the physiological implications are also important. For example, it is usually desirable to maintain an asthmatic under the constant influence of medication while at the same time avoiding either over-dosage, under-dosage or both.

A conventional method for making long-acting tablets is to coat a core of the active ingredient with a substance which will not be affected by stomach juices but will be dissolved by intestinal fluids, as for example, a glyceryl ester of a higher fatty acid. To this coated core there is then applied, by means of pan-coating, another layer of active ingredient. One of the disadvantages of preparing tablets of this kind is that physiological action of the active component is unevenly distributed, giving the patient a strong initial dose, followed by a short period of no drug release. After the protective coat has had time to disintegrate, the active material in the inner core is then quickly released and the patient receives the second dose. In the treatment of chronic diseases, this sudden release of drug after a latent period is a highly undesirable manifestation since it may deprive the patient of therapy at a point when he most requires it. Another disadvantage of this type of tablet is the inaccuracy of dosage, since the application of the outer coating is difficult to control causing either initial under-dosage or over-dosage.

An alternative method for making "delayed" or "prolonged" action dosage unit forms is to prepare several different groups of granules of the active ingredient, each granule having a different disintegration time. In addition to the fact that this is an extremely costly method of manufacture, this dosage unit form is undesirable because it is difficult to assure a uniform release of the drug. When the granules are coated there is no control measure for ascertaining uniform coating, making it difficult to predict when each granule will disintegrate.

We have now discovered a method for preparing accurate prolonged-action dosage unit forms for oral administration. Our method comprises the preparation of a core, having evenly and thoroughly distributed therein an accurate amount of a therapeutic ingredient together with a mixture of substances which are non-absorbable from the gastro-intestinal tract but which, when compounded in the manner described below, are capable of releasing the therapeutic substance slowly over an extended period of time. Around this core there is then compressed, by suitable mechanical means, a layer of the therapeutically active ingredient in admixture with a sufficient quantity of excipients, binders and lubricants to obtain a tablet of suitable size and hardness.

The combination of ingredients used in the formation of the core in accordance with our process depends not only upon the nature of the active component, but upon the character of the core ingredients as well. We have found that a core most advantageous for our purposes is one which contains a combination of waxes and solid alcohols. Substances which may be employed in the preparation of the core, either singly or in combination, include beeswax, spermaceti, japan wax, paraffin, carnauba wax, jojoba oil, bayberry wax, candelilla, ozokerite, montan wax and similar substances, in admixture with higher alcohols such as cetyl alcohol, palmitic alcohol or stearyl alcohol.

The proportions of the ingredients employed in the core are not critical and may vary considerably depending upon the density of the active component, the dose to be administered and the compressibility of the particular ingredients selected.

In a preferred embodiment our method includes preparing the inner core by melting and mixing the solid, high-melting carriers, adding an active component thereto, dispersing it thoroughly and allowing the mixture to solidify. The resultant mass is then passed through a sieve of suitable mesh size, a small quantity of lubricant is added thereto, and the mixture is compressed by mechanical means. As lubricants one may advantageously employ talc, stearic acid, magnesium stearate, or mixtures thereof.

The outer coating is prepared by mixing the desired amount of active ingredient with inert excipients, binders and lubricants usually employed in the tableting art. For example, as excipients there may be employed milk sugar, corn starch, or other therapeutically inert substances. As binders to insure adequate cohesive properties, there may be used sucrose, acacia or tragacanth. If desired, a water soluble polyethylene glycol such as Carbowax 6000 may be included to provide added binding properties. Water, a lower alkanol such as methyl, ethyl, propyl or isopropyl alcohol, acetone or mixtures thereof may be advantageously used as moistening agents in our process. The mixing of these ingredients, the preparation of a wet mass for granulation, drying and sieving are accomplished in a manner known to those skilled in the art. The addition of a lubricant to the dry mixture of powdered ingredients, prior to its conversion to a wet mass preparatory to the formation of the granules, is a novel process described in the copending application filed concurrently herewith by Cooper et al., Serial No. 574,103, now Patent No. 2,857,313.

An alternative and equally suitable method for making a core adaptable for prolonged drug release in accordance with our process includes the admixture of shellac-coated nonpareils containing the active ingredient, with wax granules containing the active ingredient. In accordance with this modification, nonpareil seeds of sucrose and starch are coated with the active ingredient until the proper size and concentration are achieved. These granules are coated with successive coats of shellac until they will remain intact for a period of 2 hours in artificial gastric fluid but disintegrate after 1 hour in artificial fluid. The number of coats required for this purpose varies from 12 to 18. The average number is 15 coats. These granules are then mixed with the correct proportions of granules prepared by the fusing of the active ingredient with solid, high-melting carriers.

The compression of the outer coating about the core may be accomplished by any one of several suitable mechanical means known to those skilled in the art. A common method is to employ a machine such as that described by Mitchell, in Manufacturing Chemist, volume 26, page 107, 1955, this machine being capable of feeding the core and compressing a dry granular mass about the same in a single operation.

The duration of action of a prolonged action tablet prepared in accordance with our process, will vary widely depending upon the physical character of the active component, the age and weight of the patient, the amount and kind of food being taken during the time of therapy as well as the peculiarities in the physical make-up of each particular individual. However, it may generally be stated that the duration of action will last from about 9 hours to about 12 hours, optimally about 10 hours.

To illustrate the surprisingly uninterrupted and evenly distributed rate of release of the active ingredient after the initial absorption of the outer coat, the following test was conducted in duplicate: Six 100 mg. tripelennamine tablets made in accordance with our process were placed in a U.S.P. disintegration apparatus (United States Pharmacopoeia XV, page 937) at 37° C. using artificial gastric juices for the first two hours and artificial intestinal fluid for the remaining hours. (For formulae of these juices see Clarkson, Tablet Coating, p. 64, Drug and Cosmetic Index, 1951). The bath was changed at hourly intervals, and assayed for tripelennamine content with the following results:

| Time | Tripelennamine Released | |
|---|---|---|
| | Experiment I | Experiment II |
| | Percent | Percent |
| 1 hour gastric | 48.30 | 38.90 |
| 2 hours gastric | 4.25 | 5.30 |
| 1 hour intestinal | 8.05 | 7.00 |
| 2 hours intestinal | 6.62 | 8.60 |
| 3 hours intestinal | 7.07 | 7.80 |
| 4 hours intestinal | 5.67 | 7.50 |
| 5 hours intestinal | 5.67 | 6.60 |
| 6 hours intestinal | 10.40 | 9.20 |
| 7 hours intestinal | 4.25 | 9.10 |

It is to be noted that our process for preparing prolonged action tablets employs a novel and unique manner of incorporating a therapeutically active substance intimately and thoroughly with a combination of ingredients which are non-absorbable from gastro-intestinal contents. The compression of an outer coating about the inner core, which also contains a quantity of active ingredient, permits quick absorption and rapid physiological response immediately after ingestion. The core, which remains in the stomach contents and eventually passes into the intestinal tract, is subjected to a slow leaching process which, in addition to the normally incurred movements due to spasms, slowly extracts from the core all of the therapeutic component dispersed therethrough.

The applications of our novel process for the formulation of various types of long-acting tablets embrace a wide range of possibilities. In the treatment of hay fever, for example, it may be desirable to administer a drug such as tripelennamine but once or twice daily with the assurance that the patient is not being deprived of the drug at any given time during the course of a day or a night. Similarly, in the treatment of peptic ulcer, it may be desirable to administer an anticholinergic such as oxyphenonium bromide over a prolonged period. For inducing mild central nervous system stimulation a prolonged period of time, it may be desirable to administer a drug such as methyl phenidylacetate in the form described in this application. On the other hand, it may be necessary, in treating an ulcer patient, to combine an anticholinergic with a ganglionic blocker such as chlorisondamine. In such cases the ganglionic blocker would be employed in the outer coat whereas the anticholinergic would be incorporated in the inner core. In the treatment of hypertension where it is desirable to insure proper reduction of blood pressure without over-sedation, it may be desirable to combine a hypotensive drug such as reserpine in the inner core, with a mild central nervous system stimulant such as methyl phenidylacetate in the outer coating.

Various other applications of our novel process as well as numerous combinations which may be suitably employed in formulating our novel prolonged-action tablet will readily occur to those skilled in the art and it is intended that these be included within the scope of our application.

The following examples are submitted as being illustrative of the invention but are not intended to be a limitation thereon.

*Example 1*

*Core.*—670 grams of tripelennamine hydrochloride are added to a melted mass of 655 grams of carnauba wax and 655 grams of stearyl alcohol, and the resulting mixture stirred until solidified. The wax mixture is reduced to granules by passing through a No. 16 mesh screen. The granules are lubricated by the addition of 20 grams of magnesium stearate. The mass is well-mixed and then compressed into tablets using a $10/32''$ size punch and die.

*Coating.*—330 grams of tripelennamine hydrochloride are mixed with 132 grams of Carbowax 6000, 1451 grams of milk sugar, 397 grams of confectioner's sugar and 132 grams of talcum. The powders are passed through a sieve of suitable mesh size, granulated with a binder containing 40 grams of acacia and 40 grams of tragacanth in a 50% hydroalcoholic solution and the wet mass is passed through a sieve. The granulation is allowed to dry at a temperature of about 40° C. and is then passed again through a sieve. The dry granular coating is compressed evenly around the core using suitable mechanical means and a $13/32''$ size punch and die.

The above formulation is based on a quantity of 10,000 tablets. When prepared as directed, each tablet will contain 100 mgs. of tripelennamine hydrochloride, 67 mgs. being in the core and 33 mgs. being in the coating.

*Example 2*

*Core.*—100 grams of oxyphenonium bromide are added to a mixture containing 445 grams of carnauba wax and 445 grams of stearyl alcohol having dispersed therethrough 10 grams of magnesium stearate. The mass is mixed and passed through a No. 16 mesh screen and compressed into tablets with an $8/32''$ size punch and die.

*Coating.*—50 grams of oxyphenonium bromide are triturated with 40 grams of acacia, 40 grams of tragacanth, 1370 grams of lactose, 300 grams of confectioner's sugar and 100 grams of talcum. 100 grams of Carbowax 6000 are dissolved in 100 cc. of water and 200 cc. of alcohol. The previously mixed powders are granulated with this solution, the wet mass is passed through a No. 12 mesh screen and are dried. The dry granules are passed through a No. 16 mesh screen.

The previously described core is coated with the coating granulation and is compressed about the core with an $11/32''$ size punch and die.

The above formulation is based on 10,000 tablets. When prepared as directed, each tablet will contain 15 mgs. of oxyphenonium bromide, 10 mgs. being in the core and 5 mgs. being in the outer coat.

*Example 3*

*Core.*—A quantity of 770 grams of nonpareils is placed in a suitable coating pan and coated with 330 grams of tripelennamine hydrochloride. The granules are then coated with shellac until they meet the desired disintegration requirements. A quantity of 340 grams of tripelennamine hydrochloride is added to a melted mass of 504 grams of carnauba wax and 503 grams of stearyl alcohol. The mass is stirred until solidified and passed through a No. 16 mesh screen, lubricated with 14 grams of magnesium stearate and mixed with the shellac coated nonpareils and compressed with a 10/32" size punch and die.

*Coating.*—A coating containing tripelennamine as the active ingredient is prepared in accordance with Example 1 above and is compressed about the above-described core with a 13/32" size punch and die. The above formulation is based on 10,000 tablets. When prepared in accordance with the directions given above, each tablet contains 100 mg. of tripelennamine, 67 mgs. being in the core and 33 mgs. being in the outer coating.

Example 4

*Core.*—100 grams of methyl phenidylacetate as the hydrochloride are added to a mixture containing 445 grams of carnauba wax and 445 grams of stearyl alcohol, and the resulting mixture stirred until solidified. The wax mixture is reduced to granules by passing through a No. 16 mesh screen. The granules are lubricated by the addition of 10 grams of magnesium stearate. The mass is well-mixed and then compressed into tablets using an 8/32" size punch and die.

*Coating.*—50 grams of methyl phenidylacetate as the hydrochloride are triturated with 40 grams of acacia, 40 grams of tragacanth, 1370 grams of lactose, 300 grams of confectioner's sugar and 100 grams of talcum. 100 grams of Carbowax 6000 are dissolved in 100 cc. of water and 200 cc. of alcohol. The previously mixed powders are granulated with this solution, the wet mass is passed through a No. 12 mesh screen and are dried. The dry granules are passed through a No. 16 mesh screen.

The previously described core is coated with the coating granulation and is compressed about the core with an 11/32" size punch and die.

The above formulation is based on 10,000 tablets. When prepared as directed, each tablet will contain 15 mgs. of methyl phenidylacetate, 10 mgs. being in the core and 5 mgs. being in the outer coat.

Example 5

*Core.*—100 grams of oxyphenonium bromide are added to a mixture containing 440 grams of carnauba wax and 440 grams of stearyl alcohol, and the resulting mixture stirred until solidified. The wax mixture is reduced to granules by passing through a No. 16 mesh screen. The granules are lubricated by the addition of 20 grams of magnesium stearate. The mass is well-mixed and then compressed into tablets using an 8/32" size punch and die.

*Coating.*—50 grams of chlorisondamine chloride are mixed with 100 grams of Carbowax 6000, 1300 grams of milk sugar, 300 grams of confectioner's sugar and 100 grams of talcum. The powders are passed through a sieve of suitable mesh size, granulated with a binder containing 40 grams of acacia and 40 grams of tragacanth in hydroalcoholic solution and the wet mass is passed through a sieve. That granulation is allowed to dry at a temperature of about 40° C. and is then passed again through a sieve. The dry granular coating is compressed evenly around the core using suitable mechanical means and a 13/32" size punch and die.

The above formulation is based on a quantity of 10,000 tablets. When prepared as directed, eacth tablet will contain 10 mgs. of oxyphenonium bromide in the core and 5 mgs. of methyl phenidylacetate as the hydrochloride in the outer coating.

What is claimed is:

1. A long-acting orally administrable dosage unit form comprising an inner core having a therapeutically active substance intimately interspersed throughout a waxy material selected from the group consisting of waxes, solid alcohols and mixtures thereof, and an outer coating compressed onto said waxy substance comprising a standard granulation mixture containing a therapeutically active substance, excipients and binders.

2. A long-acting orally administrable dosage unit form as defined in claim 1, wherein the therapeutically active components in the inner core and in the outer coating have the same physiological action.

3. A long-acting orally administrable dosage unit form as defined in claim 1, wherein the therapeutically active components in the inner core and in the outer coating have different physiological actions.

4. A long-acting orally administrable dosage unit form comprising an inner core having an antihistaminic substance intimately interspersed throughout a waxy material selected from the group consisting of waxes, solid alcohols and mixtures thereof, and an outer coating compressed onto said waxy material comprising a standard granulation mixture containing an antihistaminic substance, excipients and binders.

5. A long-acting orally administrable dosage unit form comprising an inner core having an anticholinergic substance intimately interspersed throughout a waxy material selected from the group consisting of waxes, solid alcohols and mixtures thereof, and an outer coating compressed onto said waxy material comprising a standard granulation mixture containing an anticholinergic substance, excipients and binders.

6. A long-acting orally administrable dosage unit form comprising an inner core having an anticholinergic substance intimately interspersed throughout a waxy material selected from the group consisting of waxes, solid alcohols and mixtures thereof, and an outer coating compressed onto said waxy material comprising a standard granulation mixture containing a ganglionic blocking agent, excipients and binders.

7. A long-acting orally administrable dosage unit form comprising an inner core having a hypotensive substance intimately interspersed throughout a waxy material selected from the group consisting of waxes, solid alcohols and mixtures thereof, and an outer coating compressed onto said waxy material comprising a standard granulation mixture containing a central nervous system stimulant, excipients and binders.

8. A long-acting orally administrable dosage unit form comprising an inner core having a central nervous system stimulant intimately interspersed throughout a waxy material selected from the group consisting of waxes, solid alcohols and mixtures thereof, and an outer coating compressed onto said waxy material comprising a standard granulation mixture containing a central nervous system stimulant, excipients and binders.

9. A long-acting orally administrable dosage unit form comprising an inner core having tripelennamine hydrochloride intimately interspersed throughout a waxy material selected from the group consisting of waxes, solid alcohols and mixtures thereof, and an outer coating compressed onto said waxy material comprising a standard granulation mixture containing tripelennamine hydrochloride, excipients and binders.

10. A long-acting orally administrable dosage unit form comprising an inner core having oxyphenonium bromide intimately interspersed throughout a waxy material selected from the group consisting of waxes, solid alcohols and mixtures thereof, and an outer coating compressed onto said waxy material comprising a standard granulation mixture containing oxyphenonium bromide, excipients and binders.

11. A long-acting orally administrable dosage unit form comprising an inner core having methyl phenidylacetate intimately interspersed throughout a waxy material selected from the group consisting of waxes, solid alcohols and mixtures thereof, and an outer coating compressed onto said waxy material comprising a standard granulation mixture containing methyl phenidylacetate, excipients and binders.

(References on following page)

References Cited in the file of this patent

UNITED STATES PATENTS

| | | |
|---|---|---|
| Re. 24,090 | Diamond | Nov. 15, 1955 |
| 2,413,419 | Saunders et al. | Dec. 31, 1946 |
| 2,736,682 | Hermelin | Feb. 28, 1956 |
| 2,738,303 | Blythe | Mar. 13, 1956 |
| 2,757,124 | Wolff | July 31, 1956 |
| 2,793,979 | Svedres | May 28, 1957 |

FOREIGN PATENTS

| | | |
|---|---|---|
| 514,047 | Great Britain | Oct. 30, 1939 |

OTHER REFERENCES

"Celacets," a brochure of the Suter Chem. Co., Altoona, Pa., 1949 (4 pp.).

UNITED STATES PATENT OFFICE

CERTIFICATE OF CORRECTION

Patent No. 2,887,438                                          May 19, 1959

Jack Cooper et al.

It is hereby certified that error appears in the printed specification of the above numbered patent requiring correction and that the said Letters Patent should read as corrected below.

Column 2, lines 65 and 66, for "in artificial fluid" read -- in artificial intestinal fluid --.

Signed and sealed this 29th day of September 1959.

(SEAL)
Attest:

KARL H. AXLINE
Attesting Officer

ROBERT C. WATSON
Commissioner of Patents

Dedication 2,887,438.—*Jack Cooper*, Summit, and *John Joseph Windheuser*, Milton, N.J. PROLONGED ACTION TABLETS. Patent dated May 19, 1959. Dedication filed Jan. 3, 1963, by the assignee, *Smith Kline & French Laboratories*.

Hereby dedicates to the public of the United States the full term of said patent.

[*Official Gazette February 5, 1963.*]